Dec. 23, 1952         H. W. SUHR         2,623,154

ELECTRIC HEATER

Filed Feb. 25, 1950         2 SHEETS—SHEET 1

INVENTOR.
Herman W. Suhr
BY
Louis O. French
ATTORNEY

Dec. 23, 1952   H. W. SUHR   2,623,154
ELECTRIC HEATER

Filed Feb. 25, 1950   2 SHEETS—SHEET 2

INVENTOR.
Herman W. Suhr
BY
Louis O. French
ATTORNEY

Patented Dec. 23, 1952

2,623,154

UNITED STATES PATENT OFFICE 2,623,154

ELECTRIC HEATER

Herman W. Suhr, Milwaukee, Wis., assignor to Acme Sheet Metal Works, Milwaukee, Wis., a corporation of Wisconsin Application February 25, 1950, Serial No. 146,184

4 Claims. (Cl. 219—39)

The invention relates to heaters and more particularly to electric heaters.

In some forms of electric heaters the electrically heated element or elements are disposed in an open position to be blown on by air from a fan. Heaters of the types above described are only used for heating a limited area about the heater, and they are not efficient as the air blown on the heating element by the fan has the effect of darkening the incandescent element so that it does not operate at its highest efficiency. The object of the present invention is to provide a heater of high efficiency in which the heating elements will operate continuously at an incandescent or glowing heat and in which this heat is efficiently distributed to the air. More particularly, according to the invention, the heating element is mounted in a conduit through which air to be heated is passed at a relatively slow rate or velocity and a much larger body of air is passed about the exterior wall of the conduit at a relatively high rate or velocity past radiating fins forming integral parts of the conduit enclosing the heater, said heater being mounted in an air circulating duct by which the heated air may be distributed to any desired place. The heater of this invention is made up of a number of units which number may be varied to suit the heating requirements, and it may be used for house heating in place of the usual furnaces.

A further object of the invention is to provide a heating apparatus comprising an inner conduit and outer conduit through which air is circulated, the air being circulated through the inner conduit at a rate to maintain incandescence of the electrical heated element disposed therein.

The invention consists in the several features hereinafter set forth and more particularly defined by claims at the conclusion hereof.

Figure 1:
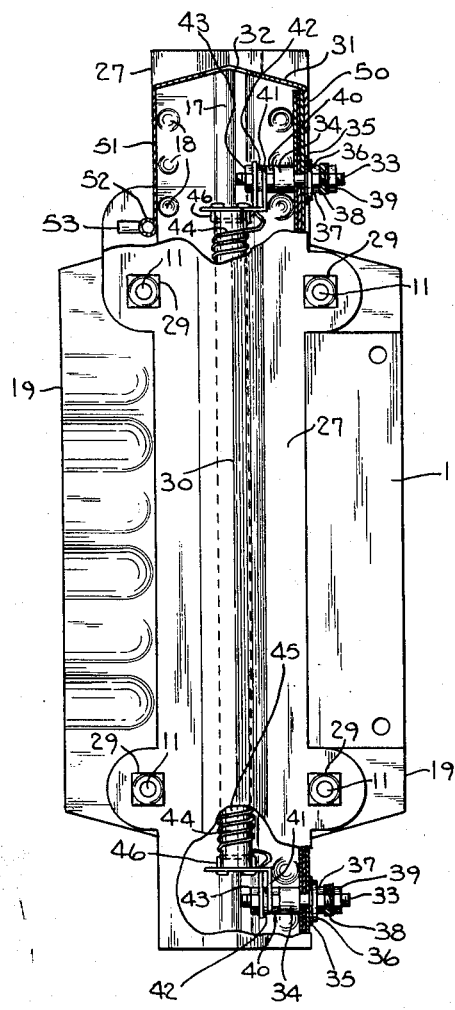
Fig. 1 is an end elevation view of a heater embodying the invention.

Referring to the drawings, the heater is designed to be mounted in a conduit 6 through which air is drawn by a suction fan 7 driven by a belt connection 8 with an electric motor 9, the heater having side bracket portions 10 secured to the side walls of the conduit 6 to support the heater therein.

The heater structure is formed of a number of sheet metal plates which are secured together by sets of spaced tie bolts 11 to provide one or more inner conduits 12 and an outer surrounding conduit 13.

These conduits 12 and 13 are formed by sheet metal members 14, 15, and 16.

The members 14 have longitudinally corrugated portions 17 and bumps or projections 18 forming stops, and they also have lengthwise extending corrugated end portions 19.

The members 15 on one side of each conduit 12 are formed to provide a side wall 20 for this conduit and are then bent backwardly at 21 and outwardly at 22 from each end of said wall 20, the parts 22 being lengthwise corrugated.

The members 16 are generally similar to the members 15, but since they have the heating element terminals secured thereto, they are formed to provide a side wall 23 for the other side of each conduit 12 and are then bent backwardly at 24, so that at their upper and lower ends 25 they overlap and intermediate their ends they are bent outwardly at 26 and formed with lengthwise extending corrugations.

The projections 18 form stops against which the side walls 20 and 23 of the members 15 and 16 abut in the assembled position of the units.

End plates 27 of heavier sheet metal have the bracket portions 10 previously referred to and sets of spaced apertured ears 28 through which the tie bolts 11 pass. All the members 14, 15, and 16 have apertures therein alined with the apertures in the ears 28, and after these parts are assembled on bolts 11, they are clamped in assembled position by nuts 29 on the threaded ends of said bolts. The plates 27 also have a longitudinally extending U-shaped rib portion 30.

Figure 2:
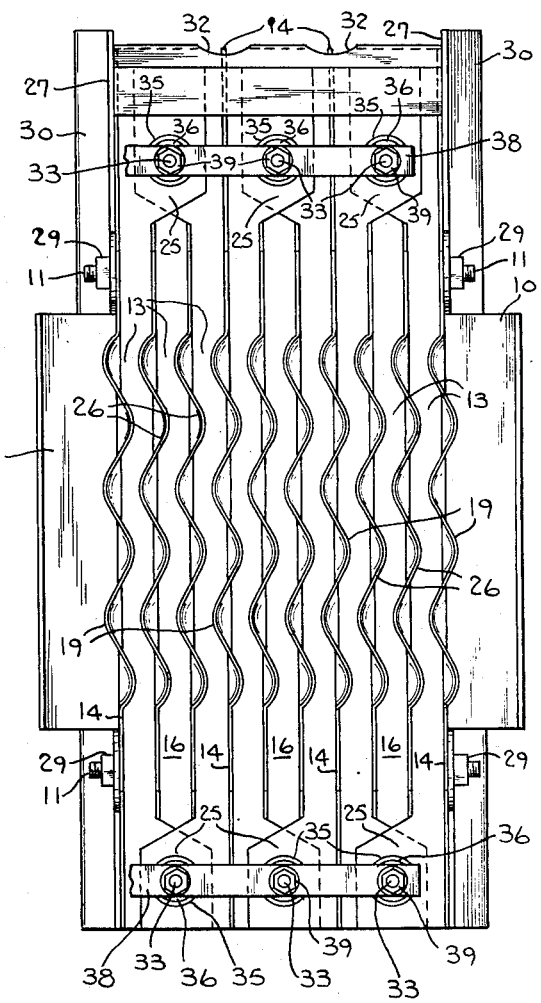
Fig. 2 is a side elevation view of the heater.
Figure 3:
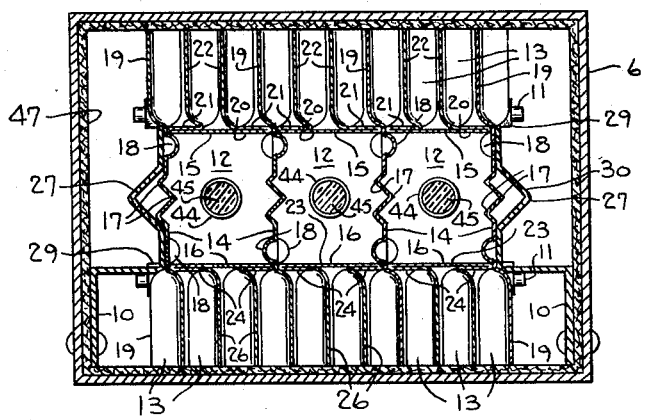
Fig. 3 is a detailed sectional view taken on the line 3—3 of Fig. 5.
Figure 4:
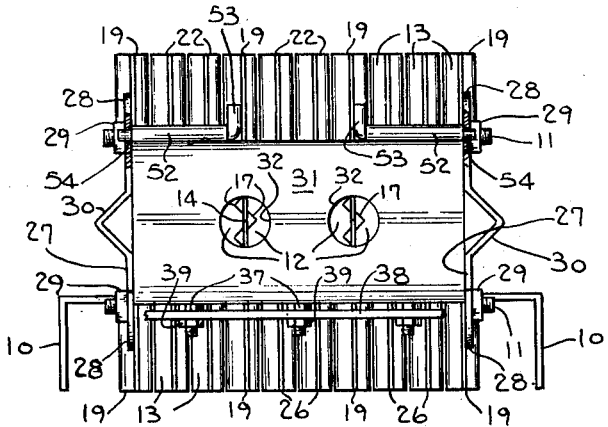
Fig. 4 is a top plan view of the heater.

A cover 31 is mounted over the tops or air entrance side of the conduits 12 and is provided with openings 32 which provide a considerably restricted opening to said conduits. It will be noted from the drawings that the openings 32 (see Figs. 1, 2, and 4) are not more than one-third of the area of the inner conduit. As shown, the centers of these openings are alined with the walls 14 separating the conduits. These restricted inlets have the effect of reducing the velocity or rate of flow of the air flowing through the conduits 12.

Terminal connections are mounted at opposite ends of the conduits 12. Each connection comprises a threaded rod 33 extending through apertures formed in the wall 23 and the overlapped parts 24 of the members 16. Each rod is insulated from the member 16 by insulating washers 34 and 35. At their outer ends each rod carries a metal washer 36 clamped against the washer 35 by a nut 37, and an apertured buss bar 38 is clamped to the rod between the nut 37 and a nut 39. The buss bar 38 connects all the terminals at one end of the unit together and is connected to any suitable supply of electric current. The inner end of each rod 33 has a nut 40 in clamping engagement with the washer 34, an apertured angle arm 41, a metal washer 42, and a nut 43 clamping these parts together and also clamping the end of the high resistance wire 44 forming the heating element between said nut 43 and the washer 42. The heating element has the wire 44 wound on a tubular core 45 of ceramic insulating material which is connected to the arms 41 at opposite ends of the conduit by tie wires 46 passing through apertures in said core and said arms. The heating element may be of any suitable type and need not necessarily be of wire but may be made of any suitable resistance material which will glow under the heating effect of the electric current. For example, this element may be of the type which goes by the trade name "Calrod."

The heater above described is mounted in the conduit 6 as previously noted, and preferably asbestos paper 47 or other heat insulating material is disposed between those portions of the walls of conduit 6 and the adjacent sides of the unit.

The corrugations exterior of the conduit 12 provide a more extensive heat radiating surface than straight or plain fins, and they also due to their sinuous form serve to create resistance and friction to the air passing between them.

The parts 14, 15, and 16 may be formed from thin sheet metal stock of copper, aluminum, or magnesium.

Figure 5:
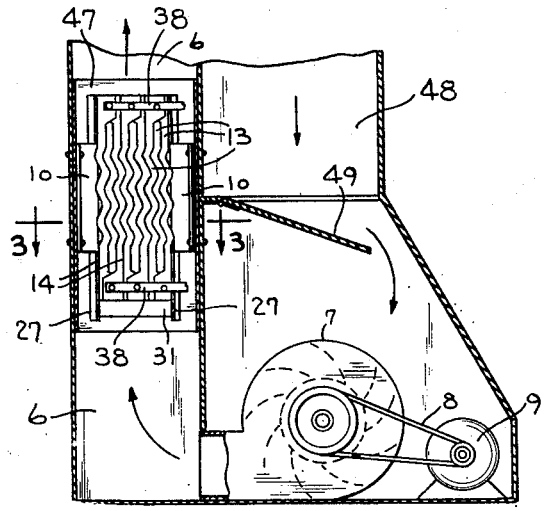
Fig. 5 is a view of the heater installed in a circulatory heating system.

With the above construction when electric current is supplied to the buss bars 38, the heating elements are heated to an incandescent or glowing temperature, and as the air is drawn in through the inlet conduit 47 of one form of heater shown in Fig. 5 by the suction fan 7, it passes down through this conduit and through the heater structure above described, the air passing through the conduits 12 moving at a slower rate than that passing through the surrounding conduit 13 containing the radiating fins above described. While in any electric heater all the current furnished is dissipated in the form of heat in prior systems using a forced air supply the heating elements do not operate at full glowing temperature, so that the air passing by them is not as highly heated as in the present structure. Furthermore, the present invention makes it possible to efficiently heat a large volume of air which may be directed to any room or rooms to be heated. In Fig. 5 the heated air is exhausted by the fan 7 into a header 48 which may have an adjustable damper 49 disposed therein.

It will be noted that cover 31 has a flange 50 that engages over one side of the inner conduits and that the other side 51 of the cover extends down on the other side of the conduits and at the lower edge of this side is provided with tubular portions 52 to receive angled locking pins 53 which may be pushed lengthwise of said guides so that their front ends engage in apertures 54 in the end plates 27 to lock the cover in position.

In the form shown, only two of the sides of each conduit 12 have large exterior radiating surface because it was desired to make the element compact in one dimension. However, where space is available, the conduits 12 may have heat radiating fins on all four sides, and furthermore, these conduits may be of other than square form, for example circular, and still be within the scope of the present invention, which is not to be limited to any specific form except as such limitations are included in the claims.

What I claim as my invention is:

1. In a heating apparatus, the combination of a conduit through which air is circulated, a heater disposed in said conduit and forming therewith a plurality of inner conduits and an outer conduit, an electrically heated element mounted in each of said inner conduits, heat radiating sinuously curved lengthwise extending sheet metal fins disposed in said outer conduit and extending substantially across the same and forming parts of the walls of said inner conduits, and an inlet opening not exceeding one-third of the area of each inner conduit restricting the flow of air through said inner conduit to maintain the operation of said electrically heated element at a glowing temperature.

2. In a heating apparatus, a heater for mounting in an enclosing conduit comprising a plurality of sheet metal members forming inner conduits with a common wall between said conduits, each of said members having a heat radiating fin projecting from the wall of said inner conduit and extending to the inner wall of the enclosing conduit, an electrically heated element mounted within each inner conduit in spaced relation to its side walls and supported from one of the walls thereof, mounting brackets for said heater, and tie rods connecting said sheet metal members and brackets together as a unit.

3. In a heating apparatus, a heater for mounting in an enclosing conduit comprising a plurality of sheet metal plates forming inner conduits of generally polygonal cross section, one of said plates forming a common dividing wall between adjacent conduits, the plates forming the ends and the dividing walls between said inner conduits each having an integral heat radiating fin projecting from the wall of said inner conduit into proximity with the wall of the enclosing conduit, the plates forming the sides of said inner conduit having an integral flange portion projecting as a heat radiating fin from said inner conduit and into proximity with the wall of the enclosing conduit and disposed between the fins of said first named plates, an electrically heated element mounted within each inner conduit in spaced relation to the sides thereof, means securing said plates in assembled relation, and means at the entrance end of said inner conduits restricting the flow of air therethrough.

4. In a heating apparatus, a heater for mounting in an enclosing conduit comprising a plurality of sheet metal plates forming inner conduits of generally polygonal cross section, one of said plates forming a common dividing wall between adjacent conduits, the plates forming the ends and dividing walls between said inner conduits each having an integral heat radiating fin projecting from the wall of said inner conduit into proximity with the wall of the enclosing conduit, the plates forming the sides of said inner conduit having spaced integral flange portions projecting as heat radiating fins from said inner conduit and into proximity with the wall of the enclosing conduit and disposed between the fins of said first named plates, an electrically heated element mounted within each inner conduit in spaced relation to the side thereof, means for securing said plates in assembled relation, and means at the entrance end of said inner conduits restricting the flow of air therethrough.

HERMAN W. SUHR.

REFERENCES CITED

The following references are of record in the file of this patent:

UNITED STATES PATENTS

| Number | Name | Date |
|---|---|---|
| 1,701,096 | Bowling et al. | Feb. 5, 1929 |
| 1,705,812 | Fisher | Mar. 19, 1929 |
| 1,754,232 | Fisher | Apr. 15, 1930 |
| 1,902,074 | Holinger | Mar. 21, 1933 |
| 2,119,161 | Hay | May 31, 1938 |
| 2,353,247 | Kuettel | July 11, 1944 |
| 2,405,072 | Trilling et al. | July 30, 1946 |
| 2,405,783 | Gardenhour | Aug. 13, 1946 |
| 2,443,983 | Gustafson et al. | June 22, 1948 |
| 2,486,501 | Soloos et al. | Nov. 1, 1949 |